United States Patent [19]

Bell

[11] 4,113,980

[45] * Sep. 12, 1978

[54] VEHICLE DIAGNOSTIC HAND CONTROL

[75] Inventor: Mace Bell, Rowayton, Conn.

[73] Assignee: United Technologies Corporation, Hartford, Conn.

[*] Notice: The portion of the term of this patent subsequent to Dec. 14, 1990, has been disclaimed.

[21] Appl. No.: 819,744

[22] Filed: Jul. 28, 1977

Related U.S. Application Data

[60] Continuation of Ser. No. 647,373, Jan. 8, 1976, abandoned, which is a division of Ser. No. 534,335, Dec. 19, 1974, abandoned.

[51] Int. Cl.² .................... G01M 15/00; G06F 3/02
[52] U.S. Cl. ................... 174/52 R; 73/117.2; 200/DIG. 2; 224/28 A; 235/146; 346/33 R
[58] Field of Search ............ 174/52 R; 200/DIG. 2, 200/5 E; 224/28 A, 55, 58; 235/145, 146; 73/431, 116, 117, 117.2, 117.3; 324/156, 19; 248/359, 360; 346/33 R; D10/75, 78

[56] References Cited

U.S. PATENT DOCUMENTS

| D. 242,722 | 12/1976 | Bell | D26/5 C |
|---|---|---|---|
| 1,585,970 | 5/1926 | Fischer | 200/DIG. 2 |
| 2,439,408 | 4/1948 | Mitchell | 206/328 X |
| 2,469,986 | 5/1949 | Phyfe | 174/52 P X |
| 3,034,717 | 5/1962 | Werner | 235/146 |
| 3,439,534 | 4/1969 | Pilgrim | 73/117 |
| 3,467,762 | 9/1969 | Boudouris | 174/52 R X |
| 3,586,276 | 6/1971 | O'Mahoney | 248/360 X |
| 3,889,273 | 6/1975 | Deiss et al. | 346/33 R |

Primary Examiner—J. V. Truhe
Assistant Examiner—David A. Tone
Attorney, Agent, or Firm—M. P. Williams

[57] ABSTRACT

A lightweight, somewhat book-shaped control unit having displays, signal lights, data entry keys, and control keys disposed in a panel has one side edge of the case rounded to permit holding in the hand in a fashion that allows pressing of a data entry key with the thumb of the same hand, there being a hand strap to assist in holding with one hand, the strap having its upper end attached to the case parallel to the edge of the case and its lower end attached to the case perpendicular to the edge of the case. A cable, which provides interconnecting wires to a console, enters at one end of the hand-holding edge of the case, normal to the edge, thereby facilitating leading the cable from the interior of the automobile when the unit is hung on the steering wheel of the vehicle by an open hanger disposed on the back of the unit, or while being held in the hand within the vehicle, as well as facilitating carrying of the unit from place to place against the weight of the dragging cable, which may be on the order of 30 feet.

2 Claims, 10 Drawing Figures

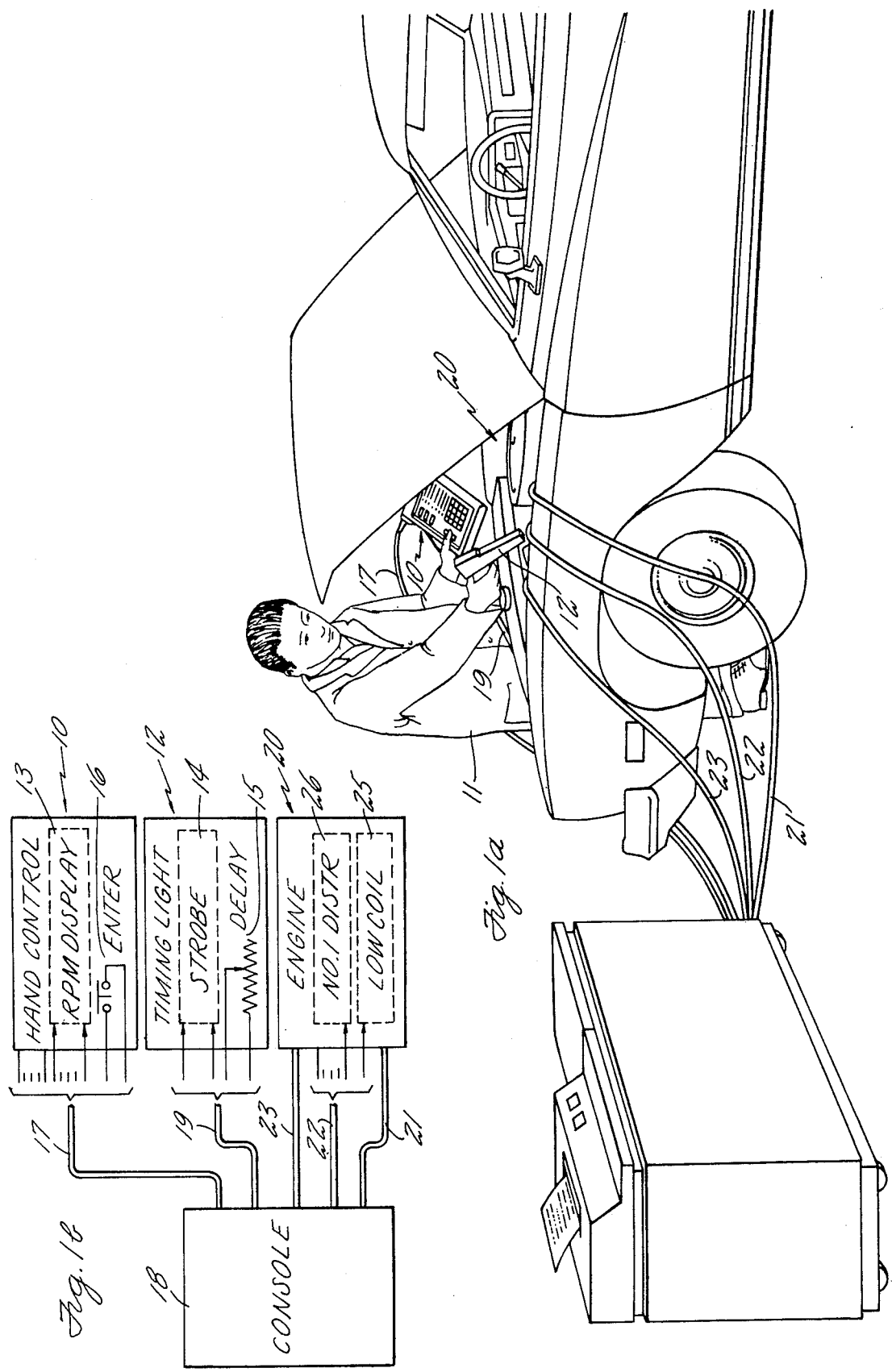

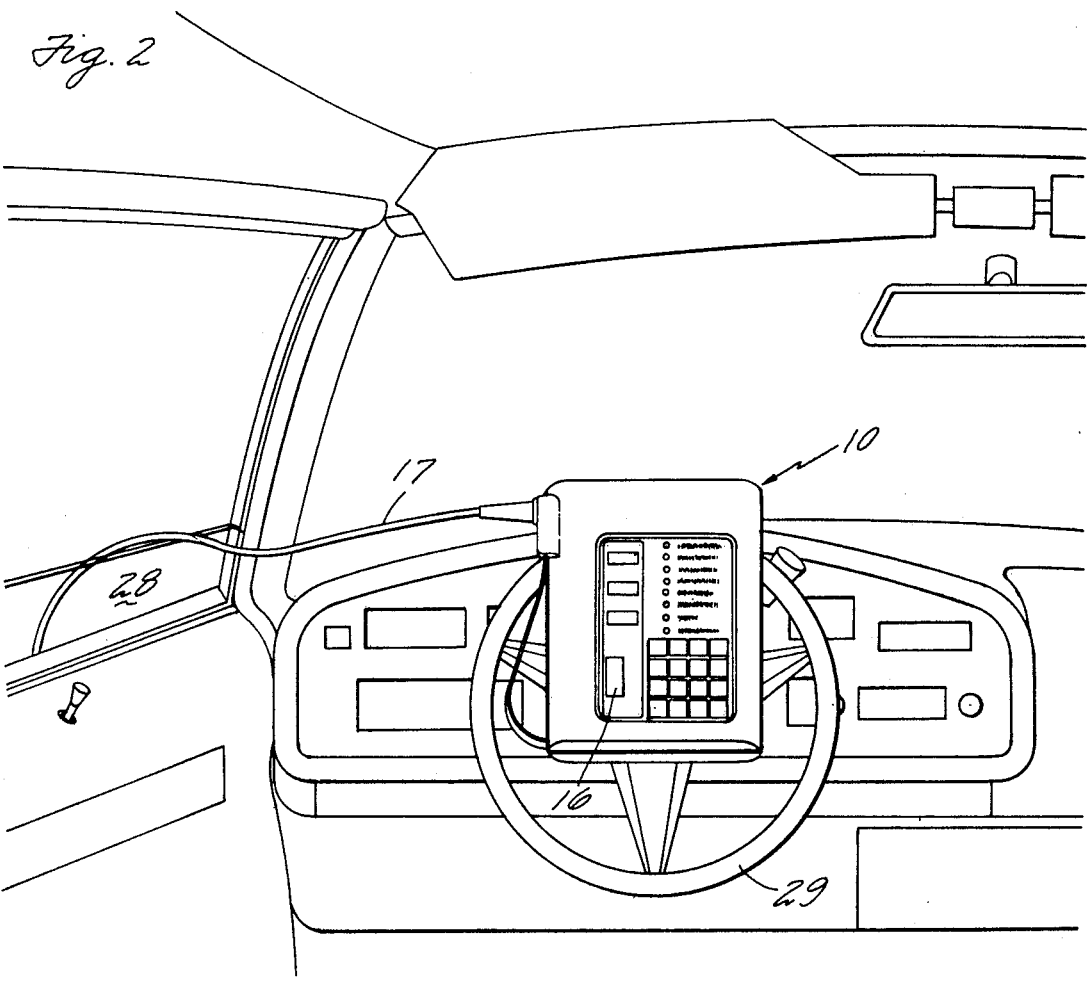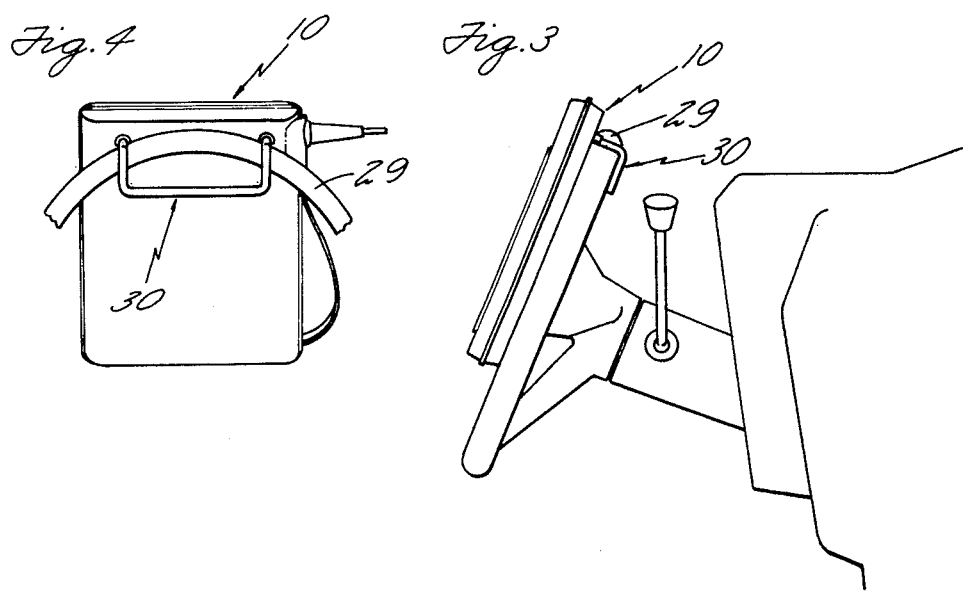

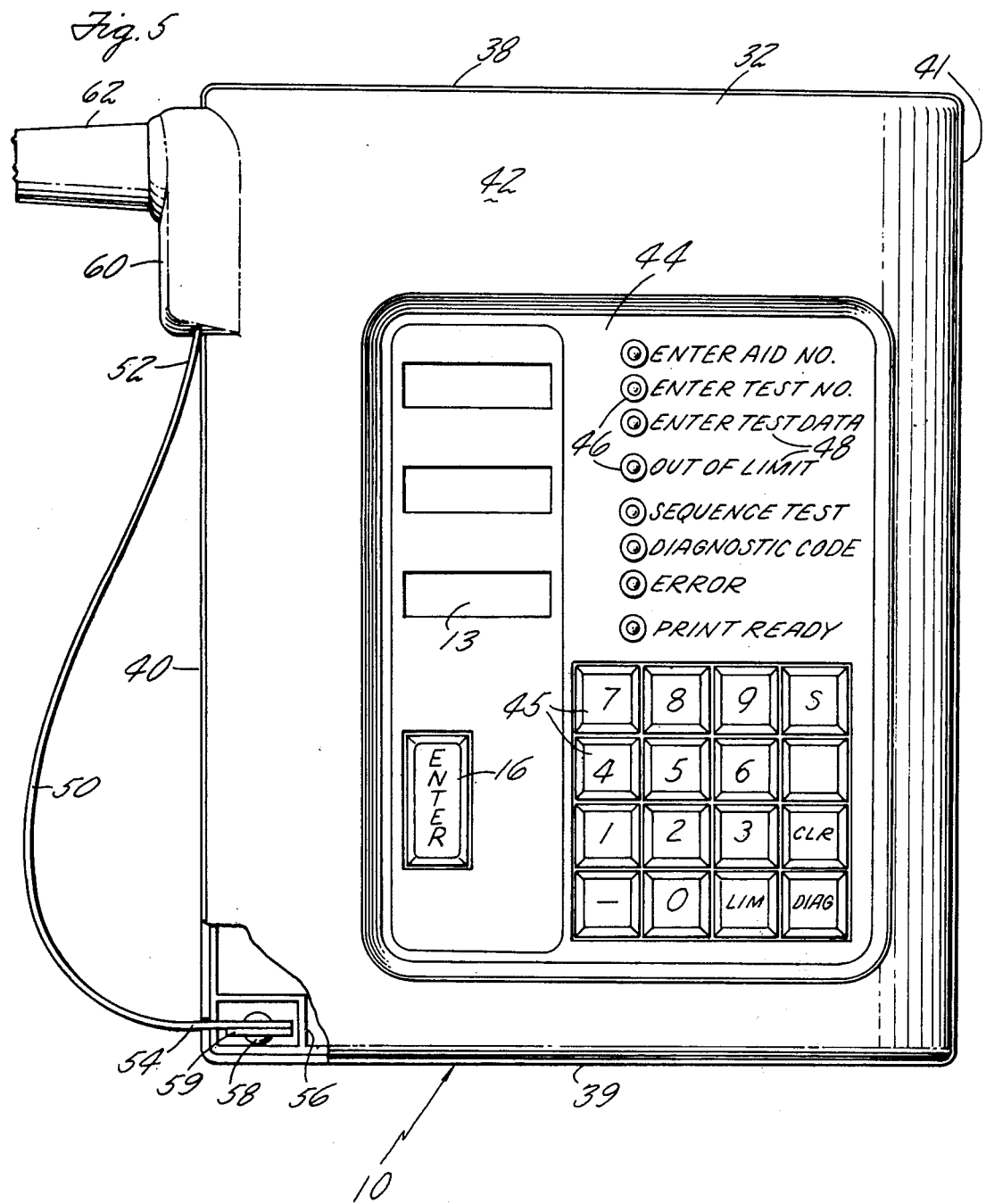

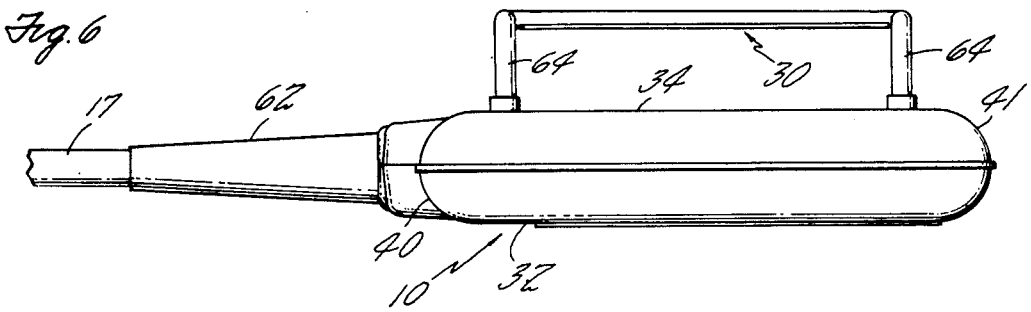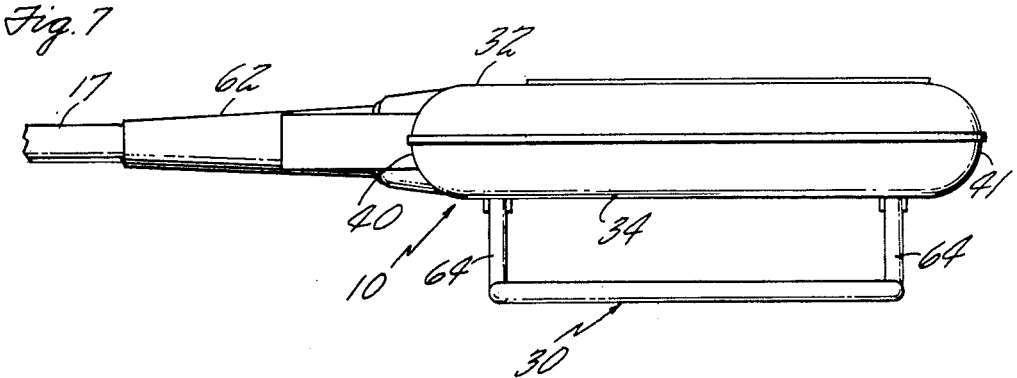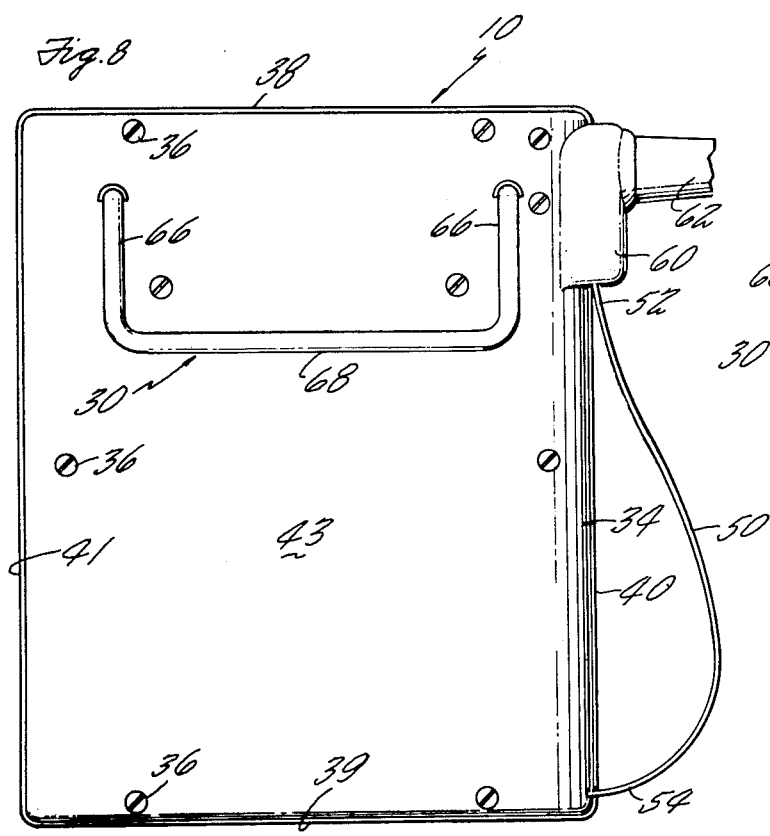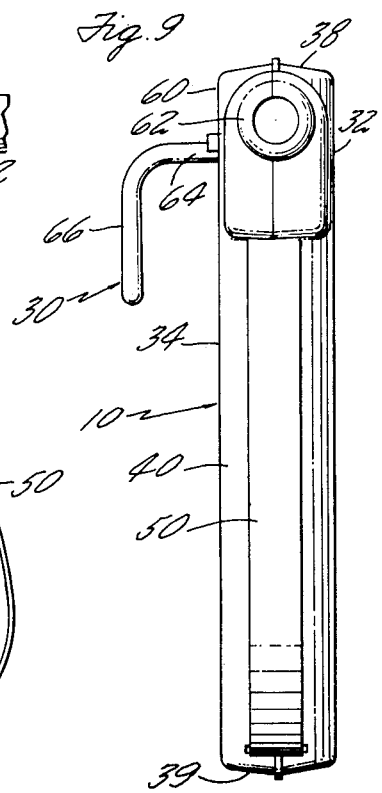

VEHICLE DIAGNOSTIC HAND CONTROL

This application is a continuation of my commonly owned copending application, Ser. No. 647,373, filed Jan. 8, 1976, now abandoned, in turn a divisional application of my commonly owned copending application, Ser. No. 534,335 filed Dec. 19, 1974, now abandoned.

BACKGROUND OF THE INVENTION

1. Field of Invention

This invention relates to vehicle diagnostic equipment, and more particularly to a hand control adapted for use in and around vehicles in conjunction with vehicle diagnostic equipment.

2. Description of the Prior Art

The recent establishment of rigid specifications relating to emissions of internal combustion engines on vehicles, in order to reduce pollutants discharged into the atmosphere, and the desire to improve fuel economy of internal combustion engines in the light of critical oil shortages, have resulted in an ever-increasing demand for more comprehensive and more accurate diagnostic systems for vehicles, particularly for internal combustion engines therein. Systems employing electronic circuitry, usually of the analog type, in combination with a variety of displays and indicators (such as cathode ray tube displays, meters, and alarm signal lights) have achieved widespread use and have evolved to a certain degree of sophistication. However, the aforementioned new demands upon performance of internal combustion engines have fostered development of more sophisticated systems, even to the point of utilizing computers for accurately performing calculations using parameters measured by transducers and probes attached to and used with the engine under test, and computer storage and analysis of the results of one or more series of tests in order to facilitate adjustment and repair.

However, such sophisticated systems must be used in relatively harsh and unclean environments, such as high usage inspection bays, repair facilities, gas stations and the like. Additionally, the sophistication of advanced diagnostic systems inherently increases the equipment cost to the point where it is necessary to provide high usage of the diagnostic equipment in order to justify its increased cost. In order to achieve high usage, it is necessary to provide equipment which is easy to use and which promotes rapid performance of a multiplicity of different tests in a hostile environment in and around the vehicle.

When tests require operator performance near the engine, the operator must have control over the diagnostic equipment near the engine compartment of the vehicle; and when tests require actual operation of the vehicle (such as cranking or starting the engine and adjusting it to different speeds), the operator must be provided with control over the diagnostic equipment while he is seated in the driver's seat of the vehicle. It can normally be expected that the operator will have to move from one station to another in performing a variety of vehicle tests, so it is necessary to provide the operator with a control which is easily moved about, even though such control may be required to have a large amount of cable thereon. If such a control is hung in a vehicle, it must be stable and the cable thereon must not get entangled in the vehicle.

SUMMARY OF THE INVENTION

Objects of the present invention include provision of a hand control for vehicle diagnostic equipment which is easily moved from place to place; may be held in one hand while operating a key thereon; and which is easily used at the driver's seat in the vehicle.

According to the present invention, a hand control for a vehicle diagnostic system, adapted to hold keys (for the entrance of data and commands to the diagnostic equipment) and indicators (for displaying data, commands and events to the operator of the diagnostic equipment), comprises a generally flat case having at least one rounded side edge contiguous with front and back surfaces, which is of a suitable size so as to permit holding the unit in one hand by gripping the rounded edge, and is further provided with features which, in various combinations, greatly improve the hand control. In further accord with the invention, a strap is disposed from the upper end to the lower end of the rounded side edge and adapted to pass around the back of the hand when holding the unit by the rounded edge. In a preferred embodiment, one end of the strap is attached to the case parallel to a side edge thereof and the other end of the strap is attached to the case perpendicular thereto. According further to the invention, the hand control and strap are such as to permit gripping in one hand, with the thumb of the same hand in a position to permit the pressing of a data entry key on the front surface of the hand control. According still further to the invention, a cable (which interconnects electrical components of the unit with remotely located diagnostic equipment) enters the case at the upper end of and perpendicular to the rounded side edge. In a preferred embodiment, the cable is fitted with a strain relief sleeve which leads the cable outwardly from the side edge in a direction perpendicular thereto. In still further accord with the invention, two widely spaced points of the upper end of a rear surface of the hand control are attached to hanger means, for hanging the hand control on a steering wheel or the like in a stable way, by contacting the steering wheel at other than its highest vertical point. In a preferred embodiment, the hanging means is formed of a single bent rod.

A hand control in accordance with the present invention is easily used in conjunction with another hand-held diagnostic tool, such as a timing light, permitting adjustments of the other hand-held tool, and depressing the data entry key in the hand control (to enter data relating to the parameter so adjusted), without the need to put down either unit to free one hand. The hand control of the present invention is easily used within the vehicle, clipped to the steering wheel (or held by the operator), without the cable getting caught in the legs of the operator, interfering with the opening and the closing of the door, or other similar entanglements. The hand control of this invention is easily moved from place to place about an inspection station or a garage, with a long cable (on the order of thirty feet in length) attached thereto, while being held in one hand, without the drag of the cable pulling the unit out of the hand, twisting or skewing it, or causing fatigue of the operator's hand.

Other objects, features and advantages of the present invention will become more apparent in the light of the following detailed description of a preferred embodiment thereof, as illustrated in the accompanying drawing.

BRIEF DESCRIPTION OF THE DRAWING

FIG. 1a is a perspective view of a hand control in accordance with the present invention used in conjunction with a second, hand-held diagnostic tool in a diagnostic system including a console;

FIG. 1b is a simplified block diagram illustrating the functional relationship of the apparatus shown in the illustration of FIG. 1a;

FIG. 2 is a front elevation view of the interior of a vehicle with the hand control of the present invention hanging on the steering wheel thereof;

FIG. 3 is a partial side elevation view of the hand control hanging on the steering wheel;

FIG. 4 is a partial rear elevation view of the hand control hanging on the steering wheel;

FIG. 5 is a front elevation view of the preferred embodiment of the invention;

FIG. 6 is a top plan view of the preferred embodiment;

FIG. 7 is a bottom plan view of the preferred embodiment;

FIG. 8 is a rear elevation view of the preferred embodiment; and

FIG. 9 is a side elevation view of the preferred embodiment.

BRIEF DESCRIPTION OF THE PREFERRED EMBODIMENT

Referring to FIGS. 1a and 1b, a preferred embodiment of the hand control 10 in accordance with the present invention is shown being held in the left hand of an operator 11, who is holding a timing light 12 in his right hand. Illustrative of a significant aspect of the present invention is that the operator can observe an RPM display 13 on the hand control 10 to ensure that the engine is at the proper operating speed, and he can observe the relative positions of the timing marks on the block and on the damper (or fan belt pulley) in the light provided by the strobe 14 of the timing light 12, while he adjusts the delay between the firing of the number one cylinder and the lighting of the strobe 14 by means of a delay potentiometer 15, which may be mounted on the timing light 12 in such a fashion as to permit adjusting of it with his index finger (as at the trigger position). When the delay is suitably adjusted, he may depress a data entry switch, such as an enter key 16 in the hand control 10. If desired, a display may also be provided in the hand control 10 for the amount of delay created by adjustment of the timing light 12, or for the actual lead angle in degrees. Thus, one aspect of the present invention relates to the ability to hold and operate the hand control 10 in a single hand, thereby permitting use of an additional diagnostic tool (such as the timing light 12) in conjunction therewith.

In a typical utilization of the present invention, as is illustrated in FIGS. 1a and 1b, the hand control 10 is connected by a multiconductor cable 17 to any suitable central unit, such as a console 18, which may house suitable electronics for processing of signals and for providing indications of the results. The timing light 12 is similarly connected by a cable 19 to the console 18. The engine 20 (FIG. 1b) may have various connections and probes attached thereto for interconnection with the console 18 by a plurality of cables 21-23. For instance, a cable 21 may connect to a clamp-on type of current probe, and the cable 23 may connect to an inline or clamp-on high voltage probe, whereas the cable 22 may represent an external harness and provide for a number of connections such as to the number one contact 24 of the distributor, the low end 25 of the high voltage coil, and other points in the engine system, such as the starter solenoid, the battery and so forth. The embodiment shown in FIGS. 1a and 1b is illustrative merely of the fact that electronic vehicle diagnosis must be performed in the real world by an operator, in a manner which facilitates the making of the tests which are required, with control over the diagnostic equipment while making those tests.

A second important aspect of the invention, illustrated somewhat in FIG. 1a, is the fact that the operator 11, by holding the hand control 10 as shown in FIG. 1a, can move the hand control around in the test environment against the drag forces of the cable 17 in a very easy fashion due to the manner in which the cable 17 is introduced to the case of the hand control 10. Since the cable 17 is substantially in line with the forearm of the operator as he holds the hand control 10 in the fashion illustrated in FIG. 1a, he can apply a direct translational force along the line of the cable 17, rather than perpendicular thereto (as would be the case if the cable 17 extended downwardly out of the bottom of the case, in a fashion which is popular in the prior art).

Yet another important aspect of the present invention, which facilitates the use of the hand control 10 within a vehicle, is illustrated in FIGS. 2-4. Therein, it is seen that the hand control 10 can readily be held in an upright position, with the cable 17 extending substantially directly through the opening above an open window 28 (or through an open door), without passing into the lap of someone sitting in the driver's seat or being entangled in the feet of the operator of the vehicle. This is true whether the hand control 10 is held in the hand or is hung on the steering wheel 29 by hanging means 30 (FIGS. 3 and 4), which thereby leaves both hands of the operator free to manipulate the controls of the vehicle as well as the keys on the hand control 10. This is in contrast with cable-connected portable units of a construction typical in the prior art, in which the cable normally extends from the bottom edge of the unit in a downward direction, which would put a loop of cable in the lap of the operator when sitting in the driver's seat, and which would tend to become entangled in the feet of the operator, or could be caught in the doorjamb. The cable 17 may be attached to the right side for use with right hand drive vehicles, if desired; then the entire hand control may be rearranged (left to right). The hanging means 30 engages the steering wheel 29 at two points (FIG. 4) which are below the maximum vertical point of the steering wheel; this provides stability, so the hand control 10 does not slide off the steering wheel as easily as it would with a solid hanging means (as in the prior art).

The detail of the hand control 10 is more fully illustrated in FIGS. 5-9. The unit includes front and rear sections of a case 32, 34 which are joined together in assembly in any suitable fashion, such as by a plurality of machine screws 36 (FIG. 8). With the two cross sections 32, 34 connected together, there is provided a case having relatively flat top and bottom edges 38, 39 (FIGS. 5, 8 and 9) rounded left and right side edges 40, 41, and front and and rear surfaces 42 (FIG. 5), 43 (FIG. 8).

In the embodiment illustrated in FIG. 5 the hand control 10 includes a panel 44 for mounting data and command entry keys, such as the enter key 16 and numeric and control keys 45, as well as displays, such as the RPM display 13, and signal lights 46 indicative of machine status or instructions to the operator as indicated by legends 48. However, the particular nature of the displays, indicators and keys, and whether these be mounted on a panel (such as the panel 44) or directly through the front surface 42 of the hand control 10, are immaterial to the present invention; the important aspect of the present invention with respect thereto is the fact that the enter key 16, or a similar data entry mechanism, be mounted with respect to one of the side edges 40, 41 so that it is easily reached by the thumb or one of the fingers of the same hand as is holding the device. In the embodiment herein, the left side edge 40 is the side edge by which the hand control 10 is held in the left hand of the operator, and the thumb of the left hand may be used to depress the enter key 16.

Another aspect of the present invention is provision of a strap 50 which is adapted to engage the rear of the left hand as it holds the hand control 10, in order to facilitate holding the unit in one hand. This makes it possible to hold the hand control 10 in the left hand for some period of time without fatigue, since the left hand can be cradled between the left side edge 40 and the strap 50. The strap 50 is unique in the further characteristic of having its upper end 52 parallel with the left edge 40 at its point of attachment to the case, whereas its lower end 54 is attached to the case perpendicular to the left edge 40. This provides preshaping and commensurate stressing of the strap in a fashion found most suitable for holding in the hand, with the left thumb disposed for easy depression of the enter key 16. The enter key 16 may be mounted higher up in the hand control, that is closer to its vertical centroid, if desired in any given utilization of the invention. The strap 50 may be disposed to the case in any suitable fashion, such as by being captured within a box 56 formed integrally with the walls of the front and rear sections 32, 34, by having a thickened portion formed thereon, either in the molding of the strap, by an end fold in the strap, or by means of a rivet 58 formed through the strap and a small locking member 59 having the same cross dimension as the strap (as viewed in FIG. 9). The upper end 52 of the strap 50 may be similarly captured, or it may be fastened in any other suitable fashion to either or both of the sections 32, 34 of the casing. On the other hand, the strap 50 may simply be fastened directly to the inside or outside surfaces of the front or rear portions 32, 34 of the case.

The hand control 10 is provided with a small protruding section 50 (FIGS. 5, 8 and 9) at the upper end of the left edge 40, simply to facilitate fastening of the strap 50 (which might otherwise be difficult due to the roundness of the left edge 40) and to facilitate joinder of the cable 17 and a related strain relief sleeve 62 to the case 32, 34. The strain relief sleeve 62 may have an annular groove formed therein so as to be captured by the joinder of the front and rear sections 32, 34 of the case, or it may be gripped in any other suitable fashion. Similarly, the cable itself may be provided with a suitable cable clamp, as is well known in the art, so as to permit forceful movement of the hand control 10 without running the risk of disengaging any of the conductors of the cable from the interior of the hand control 10.

The hanging means 30 (FIGS. 6–9) may be disposed to the rear case section 34 in any suitable fashion, such as by machine screws or suitable bonding, or it may be provided with extensions depending therefrom in a direction parallel with the rear surface 43 of the hand control 10 so as to be captured between the two sections of the case 32, 34 when they are assembled together. The hanging means 30, in a preferred embodiment of the invention, comprises a bent rod or heavy wire rather than being a solid surface, since this renders it more suitable for hanging over the steering wheel of a car, with horizontal portions 64 (FIG. 9) resting on the steering wheel on either side of the highest point of the steering wheel 29 (FIG. 4) and the vertical portions 66 extending downwardly to grip the rear of the steering wheel. This renders it more stable and less likely to slide off the steering wheel when in use. In a preferred embodiment, the hanging means 30 is a unitary structure with a crossportion 68 (FIG. 8) joining the vertical portions 66, for strength.

From the foregoing, it is seen that the major features of the hand control in accordance with the present invention include: the combination of a rounded edge and a hand strap to facilitate holding the unit by one edge; the combination of the holding edge and strap with the positioning of a data entry key such that the thumb (or other member of the hand) can readily press the data entry key when the unit is being held by the holding edge and stabilized by the strap; the combination of the holding edge and strap, with an interconnecting cable entering the control at the upper end of the holding edge, thereby to facilitate movement of the unit against the drag forces of the interconnecting cable; and the combination of a steering wheel hanging means with a cable which leaves the upper edge at the driver's side of the unit when the unit is disposed on the steering wheel on the vehicle under test. All of these advantageous combinations may be used together, as is the case in the embodiment described herein, or only some of the combinations may be used without the others of the combinations, in cases where certain features resulting from the selected combinations may be required, and others may not.

Aside from considerations of aesthetic appeal, there is no need to have the right edge 41 rounded, it being sufficient if the holding edge (the left edge 40 in the embodiment herein) is rounded so as to facilitate holding. Similarly, it is immaterial whether the top and bottom edges 38, 39 are relatively flat or rounded. The protrusion 60, although facilitating ease of assembly, is not essential to the invention, the attachment of upper end 52 of the strap 50 and the entry point of the cable 17 being accommodatable in a variety of fashions.

Similarly, although the invention has been shown and described with respect to a preferred embodiment thereof, it should be understood by those skilled in the art that the foregoing and various other changes, omissions and additions in the form and detail thereof may be made therein, without departing from the spirit and the scope of the invention.

Having thus described a typical embodiment of my invention, that which I claim as new and desire to secure by Letters Patent of the United States is:

1. A hand control for electrical vehicle diagnostic equipment adapted to be held in the hand of a user comprising:

a case having front and back surfaces, top and bottom edges, and right and left side edges, the distance between said front and rear surfaces being such as to permit holding of the unit by a first one of said side edges in one hand of a user, said first side edge being rounded so as to facilitate gripping in the hand;

a strap extending between the upper and lower ends of said one side edge, said strap adapted to support the rear of the hand of the user gripping said one side edge; and an interconnection cable including a plurality of electrical conductors entering said case at the upper end of said one side edge in a direction perpendicular thereto.

2. A hand control for electrical vehicle diagnostic equipment adapted to be held in the hand of a user comprising:

a case having front and back surfaces, top and bottom edges, and right and left side edges, the distance between said front and rear surfaces being such as to permit holding of the unit by a first one of said side edges in one hand of a user, said first side edge being rounded so as to facilitate gripping in the hand;

a strap extending between the upper and lower ends of said one side edge, said strap adapted to support the rear of the hand of the user gripping said one side edge; and an interconnection cable including a plurality of electrical conductors entering and affixed to said case at the upper end of said one side edge, said interconnecting cable having a strain relief sleeve over an initial portion thereof contiguous with said case and leading said cable outwardly from said one side edge in a direction which is perpendicular thereto.

* * * * *